May 11, 1926.
P. A. WOOD
CUTTING TOOL
Filed Feb. 12, 1924
1,584,584
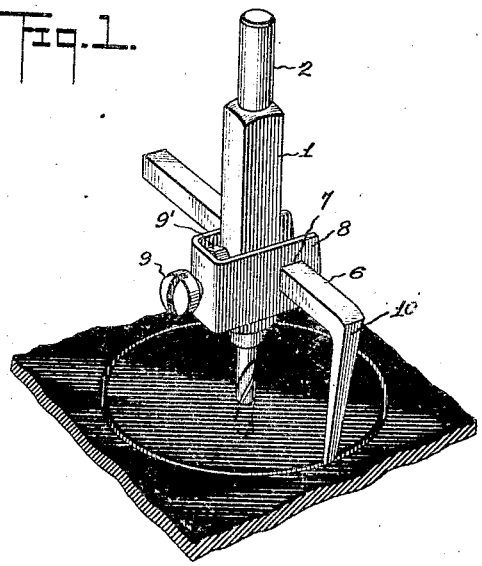
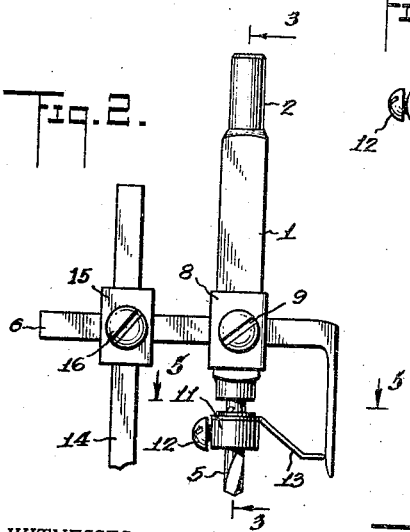
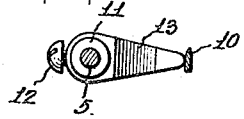
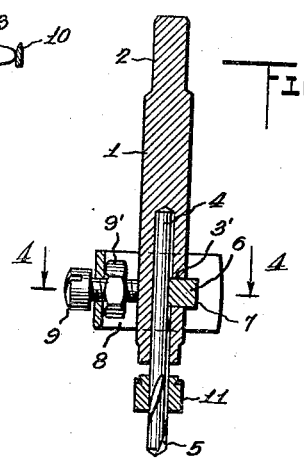
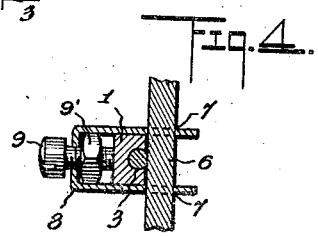
WITNESSES
INVENTOR
PINCKNEY H. WOOD,
BY
ATTORNEYS Patented May 11, 1926.

1,584,584

UNITED STATES PATENT OFFICE.

PINCKNEY A. WOOD, OF BROOKLYN, NEW YORK.

CUTTING TOOL.

Application filed February 12, 1924. Serial No. 692,387.

This invention relates to improvements in cutting tools, an object of the invention being to provide a device of the character stated which may be connected to and operated by any ordinary hand or power control means to impart a rotary motion thereto and either cut or score a circle of any desired diameter.

A further object is to provide a cutting tool of great simplicity in which a bit is provided with a laterally adjustable cutter, the bit and the cutter being simultaneously secured at any desired adjustment in the head of the tool.

A further object is to provide a tool of the character stated which is especially designed for cutting circular openings and providing circular grooves or ornamental scores in rubber or other material, and is especially adapted for use in connection with the manufacture of radio equipment although the invention is, of course, not limited to any particular use.

A further object is to provide a tool of the character stated which can be manufactured and sold at a reasonably low price and which is capable of a wide range of utility.

With these and other objects in view, the invention consists in certain novel features of construction and combination and arrangements of parts which will be more fully hereinafter described and pointed out in the claims.

In the accompanying drawings—

Figure 1 is a perspective view illustrating my improved cutting tool in operative position;

Figure 2 is a view in side elevation of the tool shown in Figure 1 with an adjustable gage thereon for controlling the depth of cutting;

Figure 3 is a view in longitudinal section on the line 3—3 of Figure 2;

Figure 4 is a view in transverse section on the line 4—4 of Figure 3;

Figure 5 is a fragmentary view in transverse section through the end of the cutter blade.

1 represents the head of my improved tool, which is preferably angular in cross section and provided with a shank 2 for attachment to a device for turning the same. This head 1 is made with a longitudinal bore 3 receiving the shank 4 of a bit 5. It will be noted that one side of the shank 4 is relatively flat and this side of the shank is exposed in a recess 3' in the head 1 so that it engages directly against a cutter bar 6, which is positioned transversely through registering openings 7 in a yoke 8 which straddles the head 1. This bar 6 fits the recess 3' and its inner face engages directly the shank 4. A set screw 9 engages a nut 9' confined within the yoke 8 and engages the head 1 so that by tightening this screw both the bar 6 and the bit 5 are securely and simultaneously clamped. The bar 6 is formed at one end with an approximately vertical cutting blade 10 which may be positioned at any desired adjustment relative to the bit 5 by adjusting the bar 6 through the yoke 8 and, as above explained, securely clamp the blade in any position of adjustment. The lower end of this blade 10 constitutes a cutter or scoring device of any desired shape in accordance with the work to be done. One form of blade is illustrated having a sharp edge and a relatively thin square edge, and this form of tool may be used in cutting soft material, such as rubber and the like, by turning the tool in one direction, and also used for cutting hard material, as for example metal and the like, by turning the tool in the opposite direction. In other words, the sharp edge is preferable in cutting soft material and the opposite edge in cutting hard material, so that the same tool can function with equal facility for both operations. On the bit 5 I provide a sleeve 11 secured in any desired adjustment by a set screw 12 and carrying an arm 13 constituting a gage to control the depth of cutting of the blade 10. By adjusting this sleeve 11 on the bit, any desired depth of cutting or scoring may be had and the work uniformly done.

The particular tool illustrated constitutes a cutter but it is perfectly obvious that the invention is not limited to the particular shape of the blade as this may be varied in accordance with the work to be done either in cutting, scoring, grooving or other operation.

It will be noted that, by reason of the construction above described, the cutting or scoring tool can be easily and quickly removed and replaced and adjusted to any desired position relative to the bit, and that the clamping or securing action is performed by a single screw 9 which functions to move the yoke 8 and simultaneously clamp the bar 6 and the shank 4 of bit 5.

It will be noted particularly by reference to Figure 2 that my device makes it possible to connect a second cutting or scoring tool 14 to the bar 6. I can accomplish this by employing a yoke 15 precisely like the yoke 8 with a set screw 16 to clamp the parts together. When an additional tool is thus employed a double scoring or cutting operation can be simultaneously carried out, as will be understood.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A tool of the character described, comprising a head, a bit removably positioned in the head, a bar movably supported against the head, a cutting blade at one end of the bar substantially parallel to the bit, and means for simultaneously clamping the bar and the bit at the desired position of adjustment.

2. A tool of the character described, comprising a head having a longitudinal bore therein and a transverse recess communicating with the bore, a bit having a shank normally in the bore of the head, a yoke straddling the head and having openings therein, a cutting tool having its transverse member positioned through the openings in the yoke and positioned in the recess in engagement with the shank of the bit, and a set screw in the yoke engaging the shank and simultaneously clamping the cutter and the bit.

3. A device of the character described, comprising an angular head having a longitudinal bore and a transverse recess in one side thereof, a bit, a shank on the bit fitting the bore and having a flat face positioned toward the recess, a yoke straddling and fitting the head, said yoke having openings in its ends registering with the recess, a cutter having a blade located substantially parallel to the bit and a bar fixed to the blade and positioned through the openings in the yoke and located in the recess, and a set screw operatively connected to the yoke and engaging the head whereby the adjustment of the set screw simultaneously clamps or releases the shank of the bit and the bar of the cutter.

4. A tool of the character described, comprising a head, a bit removably positioned in the head, a bar movably supported against the head in engagement with the bit, a cutting tool on the bar at an angle thereto, a U-shaped clamp straddling the head and having openings in its ends receiving the bar, and a screw in the clamp engaging the head and binding the bar against the head.

PINCKNEY A. WOOD.